(12) United States Patent
Tischler et al.

(10) Patent No.: US 11,486,821 B2
(45) Date of Patent: Nov. 1, 2022

(54) DEVICE AND METHOD TO SPECTRALLY RESOLVE OPTICAL RADIATION

(71) Applicants: Bar-Ilan University, Ramat-Gan (IL); Nanomotion Ltd., Yokneam (IL)

(72) Inventors: Yaakov R. Tischler, Petach Tikva (IL); Rena Yitzhari, Netanya (IL); Omree Kapon, Holon (IL); Alexander Palatnik, Jerusalem (IL); Merav Muallem, Petach Tikva (IL); Hagit Aviv, Givat Shmuel (IL); Nir Karasikov, Haifa (IL); Gal Peled, Kibbutz Ein HaHoresh (IL); Roman Yasinov, Hadera (IL)

(73) Assignees: Bar-Ilan University, Ramat-Gan (IL); Nanomotion Ltd., Yokneam (IL)

( * ) Notice: Subject to any disclaimer, the term of this patent is extended or adjusted under 35 U.S.C. 154(b) by 87 days.

(21) Appl. No.: 17/267,815

(22) PCT Filed: Aug. 8, 2019

(86) PCT No.: PCT/IL2019/050901
§ 371 (c)(1),
(2) Date: Feb. 11, 2021

(87) PCT Pub. No.: WO2020/035855
PCT Pub. Date: Feb. 20, 2020

(65) Prior Publication Data
US 2021/0172871 A1    Jun. 10, 2021

Related U.S. Application Data

(60) Provisional application No. 62/717,850, filed on Aug. 12, 2018.

(51) Int. Cl.
*G01N 21/3504* (2014.01)
*G01J 3/02* (2006.01)
(Continued)

(52) U.S. Cl.
CPC ........ *G01N 21/3504* (2013.01); *G01J 3/0208* (2013.01); *G01J 3/26* (2013.01); *G01J 3/42* (2013.01)

(58) Field of Classification Search
None
See application file for complete search history.

(56) References Cited

U.S. PATENT DOCUMENTS

| 5,401,966 A | * | 3/1995 | Gray | A61B 5/0836 250/343 |
| 10,401,296 B1 | * | 9/2019 | Muller | G01N 21/65 |

(Continued)

FOREIGN PATENT DOCUMENTS

WO    WO 2020/035855    2/2020

OTHER PUBLICATIONS

International Preliminary Report on Patentability dated Feb. 25, 2021 From the International Bureau of WIPO Re. Application No. PCT/IL2019/050901. (7 Pages).
(Continued)

*Primary Examiner* — Shawn Decenzo (57) ABSTRACT

A device that is configured to detect spectrally resolved emission from a material is disclosed. The device includes an optical cavity comprising a pair of substrates separated by a distance defined to restrict a photonic density of states (DOS) of the material to be detected, a detector oriented with respect to the optical cavity to receive emission from the optical cavity and a controller configured to control the distance. The pair of substrates includes facing reflective surfaces.

29 Claims, 5 Drawing Sheets

(51) Int. Cl.
G01J 3/26          (2006.01)
G01J 3/42          (2006.01)

(56) References Cited

U.S. PATENT DOCUMENTS

| | | | | |
|---|---|---|---|---|
| 2008/0128622 A1* | 6/2008 | Weidmann | ......... | G01N 21/3504 |
| | | | | 250/343 |
| 2008/0186508 A1* | 8/2008 | Kiesel | ....................... | G01J 3/26 |
| | | | | 356/519 |
| 2012/0170043 A1* | 7/2012 | Rao | ................... | G01N 33/0037 |
| | | | | 356/437 |
| 2015/0070698 A1* | 3/2015 | Muraviev | ............. | H01S 3/1392 |
| | | | | 356/451 |
| 2015/0077747 A1* | 3/2015 | Smith | ................... | G01N 21/64 |
| | | | | 356/318 |

OTHER PUBLICATIONS

International Search Report and the Written Opinion dated Nov. 14, 2019 From the International Searching Authority Re. Application No. PCT/IL2019/050901. (10 Pages).
Vahala "Optical Microcavities", Nature, 424(6950): 839-846, Aug. 14, 2003.

* cited by examiner

DEVICE AND METHOD TO SPECTRALLY RESOLVE OPTICAL RADIATION

RELATED APPLICATIONS

This application is a National Phase of PCT Patent Application No. PCT/IL2019/050901 having International filing date of Aug. 8, 2019, which claims the benefit of priority under 35 USC § 119(e) of U.S. Provisional Patent Application No. 62/717,850 filed on Aug. 12, 2018. The contents of the above applications are all incorporated by reference as if fully set forth herein in their entirety.

FIELD AND BACKGROUND OF THE INVENTION

The present invention, in some embodiments thereof, relates to spectroscopy and, more particularly, but not exclusively, to a device and method to spectrally resolve optical electromagnetic radiation emitted from a material, e.g., a material in a gaseous state.

The optical properties of gases and other materials are known to have distinct absorption and emission spectra that may be used as a signature from which the material may be identified. These signatures are often present in the mid-infrared (M-IR) spectral range of the electromagnetic spectrum, between about 3 µm to about 15 µm but may also be present in the short wave infrared (SWIR) spectral range and the visible or ultraviolet (UV) spectral ranges. The spectral features may be due to electronic transitions, vibrational transitions or intermolecular exciplexes.

Gases are more often identified based on their absorption spectra, because many gases are known to possess very distinct absorption spectra. However, it is often difficult to identify these distinct absorption spectra against a backdrop of thermal black-body emission. The relatively large background signal from the thermal black-body emission may often mask the relatively subtle differences between the absorption spectra of different materials.

SUMMARY OF THE INVENTION

According to an aspect of some example embodiments, there is provided a device and method for detecting an emission spectrum of a gas and optionally and preferably identifying the gas based on its distinct emission spectrum. The device includes a resonantly tunable optical cavity (e.g., a microcavity) and a detector. According to some embodiments of the present disclosure, the detection is based on tuning the resonance wavelength of the cavity to a predetermined range, introducing the gas into the optical cavity and determining whether the gas emits light at a wavelength within that range by detecting emission with the detector in a selected angular direction. In some example embodiments, the optical cavity is formed with a pair of reflective planar surfaces with a defined spacing between them that may be controlled so as to tune the resonant wavelengths and correspondingly also the range of resonant emission out of the cavity in the selected angular direction. By doing this, the sensitivity of the detection may be increased in the selected angular direction from which the emission is detected and the emission in the selected angular direction may be spectrally resolved.

It is also possible to produce a microcavity wherein the reflective surfaces are not planar, thus further controlling the directivity of the emission.

In some example embodiments, excitation of the gas is induced within the optical cavity. Optionally, the gas may be introduced into the optical cavity in an excited state. In some example embodiments, distance between the pair of reflective surfaces is modulated or dithered during measurement to provide more robust signal extraction with respect to noise and background black-body radiation.

According to an aspect of some example embodiments, there is provided a device configured to detect spectrally resolved emission from a material, the device comprising: an optical cavity comprising a pair of substrates separated by a distance defined to restrict a photonic density of states (DOS) of the material to be detected, wherein the pair of substrates includes facing reflective surfaces; a detector oriented with respect to the optical cavity to receive emission from the optical cavity; and a controller configured to control the distance.

Optionally, the facing reflective surfaces are plane parallel surfaces.

Optionally, the DOS is selected such that at least 25% of photons characterized by a predetermined wavelength are emitted by the cavity in a defined direction.

Optionally, the DOS is selected such that at least 50% of photons characterized by a predetermined wavelength are emitted by the cavity in a defined direction.

Optionally, the detector is oriented detect emission in a direction that is perpendicular to the pair of substrates.

Optionally, the distance is defined to be in a same size scale as an integer multiple of half wavelengths of the wavelength being emitted in the defined direction.

Optionally, the distance is between 1 µm to 25 µm configured to detect mid-infrared (MIR) emission, on the scale of 100 nm configured to detect ultraviolet emission or between 0.7-1 mm configured to detect long wavelength infrared.

Optionally, the device includes a precision stage configured to adjust separation of the pair of substrates to the defined distance.

Optionally, the precision stage is configured to step the defined distance over a series of pre-defined steps.

Optionally, each of the pre-defined steps is configured to impose a different angular dependency of the wavelengths emitted by the material being detected.

Optionally, the precision stage is configured to perturb the defined distance during detection by the detector.

Optionally, the precision stage is based on piezo-electric actuation or piezo driven flexures.

Optionally, the precision stage is a tripod piezo stage including Tip, Tilt, and Z movement.

Optionally, the precision stage is configured to provide nanometer accuracy and parallelism.

Optionally, the precision stage is configured to impose a gradient in the distance defined between the pair of substrates.

Optionally, the precision stage is configured to impose perturbations on the pair of substrates.

Optionally, the optical cavity is associated with a distance sensor configured to sense distance between the pair of substrates.

Optionally, the distance sensor comprises a capacitive based distance sensor.

Optionally, the facing reflective surfaces are formed with one or more of a metal coating, dielectric coating, and semiconductor coating on the substrate.

Optionally, the device includes a through going bore, through one of the pair of substrates configured to define an inlet for the material to be detected.

Optionally, the device includes an excitation device configured to activate excitation of the material to be detected.

Optionally, the excitation unit is configured to activate the excitation based on thermal excitation.

Optionally, the excitation unit is configured to heat at least one of the pair of substrates.

Optionally, the excitation unit comprises transparent conducting electrodes configured to heat the optical cavity.

Optionally, the excitation unit comprises a heating element associated with a tube through which the material to be detected enters the optical cavity.

Optionally, the excitation unit is configured to activate the excitation based on one or more of optical excitation and electrical excitation.

Optionally, the excitation unit is configured to activate the excitation based on laser excitation using one or more lasers.

Optionally, the excitation unit is configured to activate a Raman excitation.

Optionally, the excitation unit is configured to work in conjunction with absorption measurements.

Optionally, the device includes a radiation source configured to radiate through the optical cavity and thereby enable detecting absorption of the radiation by the material in the optical cavity.

Optionally, the detector is configured to detect the absorption.

Optionally, the radiation source is also configured to activate excitation of the material to be detected.

Optionally, the device includes a focusing element to direct the emission from the optical cavity onto the detector.

Optionally, includes at least one of a spatial filter and a band pass filter through which the emission is received, wherein the at least one of the spatial filter and the band pass filter is configured to reject stray radiation that is directed toward the detector.

Optionally, the device is configured to detect spectrally resolved emission from a material in its gaseous state.

According to an aspect of some example there is provided a method to detect spectrally resolved emission from a material, the method comprising: introducing the material in a gaseous state into an optical cavity with facing reflective surfaces separated by a distance that is defined to restrict a photonic density of states of the material; exciting the material in the gaseous state; and detecting emission from the optical cavity in a defined direction, wherein the emission in the defined direction is configured to be spectrally resolved based on the defined distance between the facing reflective surfaces.

Optionally, the facing reflective surfaces are plane-parallel surfaces.

Optionally, the method includes applying a selected surface wave on the facing reflective surfaces, wherein the surface wave is selected to reduce reflectivity of the facing reflective surfaces.

Optionally, the defined direction is perpendicular to the facing reflective surfaces.

Optionally, the method includes varying the distance between the facing reflective surfaces to vary at least one of said photonic density of states of the material and a resonance of the cavity.

Optionally, the distance defined is configured to impose an angular dependency of wavelengths emitted by the material being detected.

Optionally, the distance is defined to be in a same size scale as an integer multiple of half wavelengths of the wavelength being emitted in the defined direction.

Optionally, the distance is between 1 µm to 25 µm configured to detect mid-infrared (MIR) emission, on the scale of 100 nm configured to detect ultraviolet emission or between 0.7-1 mm configured to detect long wavelength infrared.

Optionally, the method includes identifying the material based on the emission detected.

Optionally, the method includes identifying the material based on the emission detected combined with wavelengths absorbed.

Optionally, the emission by the material and the absorption by the material is detected simultaneously.

Optionally, the method includes perturbing the defined distance between the facing reflective surfaces during the detection.

Optionally, the amplitude of the perturbing is 0.1% to 5% of the defined distance between the facing reflective surfaces.

Optionally, the method includes stepping the defined distance over a series of pre-defined steps and detecting emission from the optical cavity in each of the defined pre-defined steps, wherein the stepping is configured to alter an angular dependency of wavelengths emitted by the material being detected.

Optionally, the method includes detecting absorption from the optical cavity in each of the defined pre-defined steps.

Optionally, the method includes identifying the material based on an emission spectrum detected over the pre-defined steps.

Optionally, the method includes identifying the material based on an absorption spectrum detected over the pre-defined steps.

Optionally, the material is flow injected into a through going bore through one of the facing reflective surfaces.

Optionally, the exciting is based on one or more of thermal, optical and electrical based excitation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS
OF THE INVENTION

The present invention, in some embodiments thereof, relates to spectroscopy and, more particularly, but not exclusively, to a device and method to spectrally resolve optical electromagnetic radiation emitted from a material, e.g., a material in a gaseous state.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

According to some embodiments of the present disclosure, the optical cavity (e.g., microcavity) is formed with a pair of planar reflective surfaces on facing plates (e.g. substrates) that are controllably spaced from each other. The material (e.g., gas) to be analyzed may be introduced into the optical cavity by flow injection through a hole in one of the plates or between the plates. Spacing between the surfaces is optionally and preferably configured to restrict a photonic density of states (DOS) of the material (e.g., gas) that is to be analyzed and that is introduced into the cavity, so that wavelengths of the light that are emitted by the material are angularly dependent and the detector configured to detect light in the selected angular direction receives light in a confined wavelength band.

In some example embodiments, the spacing may be selected such that for a particular wavelength of interest, there are more photonic states in a particular direction or a particular range of directions than photonic states in any other direction. Preferably, the photonic DOS within the cavity is selected such that for the particular wavelength of interest all the states correspond to emission of photons within a predetermined angular range $\Delta\theta$ which is less than $\pi$ or less than $0.5\pi$ or less than $0.25\pi$ or less than $0.125\pi$. Because the cavity modifies the photonic DOS, it actually enhances the light-matter interaction of a particular resonance to occur in a particular direction. In some example embodiments, the spacing and the reflectivity coefficients of the reflective surfaces are controllably adjusted to provide the cavity with a sufficiently narrow resonance width, thereby allowing the cavity to be wavelength selective in light emitted out of the cavity in the direction of the detector. In this manner, the optical cavity may also be operated as a spectral filter, like in a Fabry-Perot interferometer.

The ability of the cavity of the present embodiments to emit a particular wavelength to a particular direction ensures that the optical cavity is both angular-selective and wavelength-selective. The angular selectivity is advantageous since it increases the sensitivity of the analysis, and the wavelength selectivity is advantageous since it increases the spectral resolution. Since both types of selectivity are governed by quantum mechanics, the sensitivity and resolution can be substantially higher than in conventional systems. Since most, more preferably all, the photonic emissions from the cavity are at wavelengths that are within the resonance of the cavity and at the direction of the detector, a gain is provided and the signal to background ratio is significantly improved. The spacing can be rendered to be a small distance between the mirrors passing a narrow band of spectrum or a large distance between the mirrors passing several wavelengths simultaneously to the detector. For narrower spacing between the mirrors, fewer wavelengths can be resonant in the cavity, whereas for larger spacing, more wavelengths can sustain standing waves and thus resonate in the cavity. This larger number of resonant wavelengths may still be restricted to a narrow angular span, however the overall strength of the angular dispersion of the cavity may be reduced for larger cavity spacing.

Generally, a cavity resonator can be categorized according to its quality factor Q, which is a measure of the number of times light bounces back and forth within the cavity before being emitted. The quality factor is oftentimes also used for describing the enhancement factor that the cavity imparts to the emission signal, both in terms of intensity and in terms of directivity. In some embodiments of the present disclosure, the cavity has a quality factor of at least 10, and sometimes as high as 1000, though it may even be 5000.

Optionally, in operation, spacing between the surfaces is scanned so that at each time interval the cavity's resonance has a different central wavelength for being emitted at the desired direction. The detector is operated to detect the emission from the cavity at each time-interval, to generate a spectrum of spectrally resolved detection.

Spacing between the reflective plates may be controlled with piezo-electric actuation or piezo driven flexures. Optionally, a tripod piezo stage including Tip, Tilt, and Z movement may be used to control spacing and orientation of the plates. In some example embodiments, the reflective plates and piezo stage is configured to provide a gradient of spacing between the reflective plates. A gradient may be used for parallel detection of multiple frequencies. In some examples, the spacing between the plates would be smaller towards one edge of the plates and then gradually increase towards another edge of the plates. This elongation would correspond to an increase in the wavelength that is resonant in the cavity.

The distance between the plates may be to 1 μm to 25 μm to detect mid-infrared (MIR). The distance may also be as little as 100 nm to detect UV and as large as 1 mm to detect long wavelength infrared (LWIR) or longer wavelengths. Stepping of the distance to scan a band of wavelengths may be accomplished. Optionally, the device comprises a sensor, such as, but not limited to, a capacitive based sensor, to monitor distance between the plates. Alternatively, the distance sensor may be an optical distance sensor. The sensor electrodes may be mounted, for example, on the plates. In some example embodiments, the distance between the reflective surfaces may be perturbed or oscillated during detection to improve robustness of detection. The amplitude of the oscillation may be a single nanometer, 10 nm, 100 nm or even larger, depending on the wavelengths and the spectral features to be detected.

The reflective plates may be formed with a coating that is reflective over a selected spectral range. Different reflective coatings may be used to tune the optical cavity to different spectral regions. The reflective coatings may be formed from metals, dielectric, semiconductors or combinations thereof. Optionally, the reflective coating is a hybrid coating, e.g. a Distributed Bragg reflector. Based on the selected coating and the defined spacing, the optical cavity as described herein may be used to detect different spectral ranges, e.g. IR, visible and UV radiation emitted from the gas.

According to some example embodiments, optical cavity may also amplify the spectrally resolved emission. This can be ensured by selecting the spacing between the mirrors to be on the same size scale (e.g. ±10%) as an integer multiple of half wavelengths of the wavelength being emitted in the defined direction. Example wavelengths emitted may include for example IR, near IR (NIR), MIR, SWIR, UV and visible light depending on the material in the cavity.

The material (e.g. gas) is excited during the detection process to enhance a signal to noise ratio and sensitivity of the output. In order to measure emission, energy is converted to light. Thus, direct excitation may not be necessary, if an internal conversion occurs, for example via a chemical reaction of some kind. Indeed, the temperature of the gas is sufficient to induce emission even without an external excitation. Excitation may be thermal excitation, optical excitation, such as by a laser apparatus of a single wavelength or a combination of wavelengths, or electrical excitation. Thermal excitation may be based on one or more modes of heating the optical cavity as a whole, heating the plates including the reflective surface and heating the gas as it enters the optical cavity. Temperatures may range from 50° C. up to 150° C. Optionally, metallic or transparent conducting electrodes may be included in the cavity and may be applied to heat the gas in the cavity. Heating may be by any technique known in the art, including, without limitation, by radiation (e.g., radio frequency (RF) waves or microwaves), and resistive heating.

According to some example embodiments, the detector is part of a detection system that includes the detector, optical components and signal acquisition components. Example optical components may include a focusing element, e.g. a parabolic mirror or a diffractive optical element configured to achromatically focus light traveling in a defined direction onto the detector and/or a spatial and spectral band pass filter configured to reject stray light. The detector may be a light radiation sensitive or heat sensitive detector. Example detectors may be photo diode detectors, photo cathode detectors or photo conductive detectors.

According to some example embodiments, both the emission spectrum and absorption spectrum of material are detected by scanning a separation between substrates of the optical cavity. Detecting both emission and absorption spectra may improve accuracy in identifying the material. In some instances, several gases may have similar emission spectra, and similar absorption spectra, and thus the combination of absorption and emission together may lead to correct identification of material. In other instances, several gases may have similar absorption spectra, and although the emission spectra will ultimately determine the type of gas, the percent absorption may be used to quantify the amount of gas that is present in the optical cavity.

Figure 1:
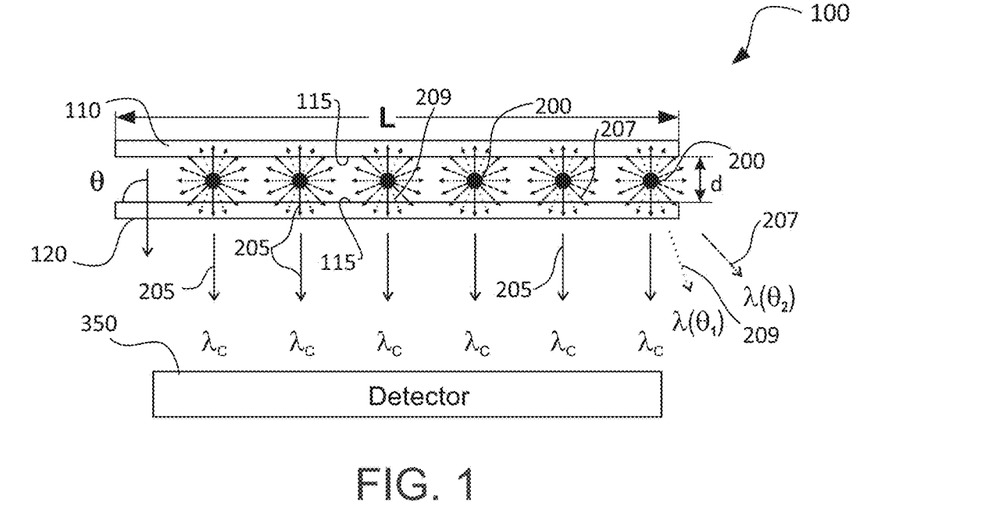
FIG. 1 is schematic drawing of example angular dependent emission from a gas in an optical cavity in accordance with some example embodiments.

Referring now to the drawings, FIG. 1 is a simplified schematic drawing of example angular dependent emission from a gas in an optical cavity in accordance with some example embodiments. According to some example embodiments, an optical cavity 100 is configured to define an angular dependence of emission of gas molecules based on a spacing 'd' between reflective surfaces 115 of optical cavity 100. Gas molecules 200 introduced into optical cavity may be from a gas, a liquid that has been evaporated, or a solid that has been subjected to sublimation. Gas molecules 200 in cavity 100 are put into an excited state while in the optical cavity or optionally before being introduced into the optical cavity. Gas excitation is not always required, as the temperature of the gas will be sufficient to provide enough energy for detectable emission in some circumstances. In general, gas excitation may be needed.

In some example embodiments, the angular dependency of the emission may be due to the confined space in optical cavity 100, defined by spacing 'd,' that restricts the DOS. Due to the confined space, the excited molecules 200 situated in optical cavity 100 may quantum mechanically only be capable of emitting a specific wavelength in a given direction. For example, for spacing 'd' wavelength $\lambda_c$ may be emitted by molecules 200 in forward direction 205, wavelength $\lambda_a$ may be emitted by molecules 200 in a direction 209 and wavelength $\lambda_b$ may be emitted by molecules 200 in a direction 207. Optionally, the range of wavelengths emitted over a 90 degree span may be repeated for each quadrant. The different directions may be altered by adjusting spacing 'd.' For example for spacing 'd' wavelength, $\lambda_c$ may be emitted in forward direction 205 by molecule 200 and for spacing d+Δd, wavelength, $\lambda_a$ may be emitted in forward direction 205 by molecule 200 while each of wavelength, $\lambda_c$ and wavelengths, $\lambda_b$ may be emitted at an angle with respect to forward direction 205.

According to some example embodiments, a detector 350 associated with optical cavity 100 is configured to capture emissions directed in a defined direction, e.g. directed in forward direction 205 and may be configured not to capture emissions emitted in other directions. As such, detector 350 with optical cavity 100 may operate as a spectral filter and the detection with detector 350 may be spectrally resolved. Furthermore, since in some embodiments substantially all of molecules 200 may be restricted to emitting wavelength $\lambda_c$, within the detection angular span, e.g. forward direction 205, detector 350 may receive substantially all emissions in wavelength $\lambda_c$. The increased gain of the detected emissions due to the alignment of the emissions in cavity 100 may be significant and may significantly improve the signal to noise ratio of output from detector 350. In some example embodiments, spacing 'd' may be scanned so that the detector 350 consecutively collects emissions from a band of wavelengths.

According to some example embodiments, optical cavity 100 is a micro-cavity meaning that spacing 'd' is at least 1 micron and less than 1 mm. Spacing 'd' may also be on a same size scale as (e.g., within 10% of) wavelengths being detected, e.g. wavelength $\lambda_c$. This may impart resonance in the micro-cavity that enhances the emission probability and likewise focus the higher intensity emission into the forward direction. Reflective surfaces 115 may be reflective coatings coated on substrates 110 and 120. Substrates 110 and 120 may be plane-parallel substrates. Properties of the reflective surfaces and distance 'd' may be defined based on the gas for detection introduced into optical cavity 100.

Figure 2:
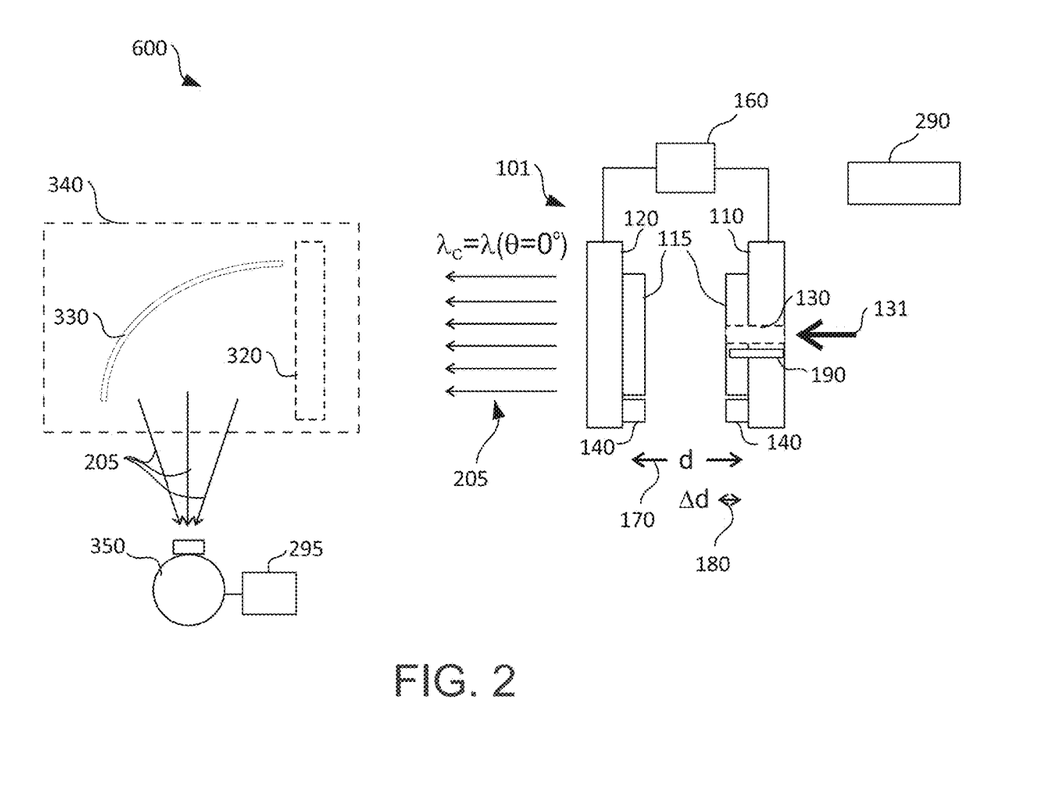
FIG. 2 is a simplified schematic drawing of an example device in accordance with some example embodiments.

Reference is now made to FIG. 2 showing a simplified schematic drawing of an example device in accordance with some example embodiments. An example device 600 to detect a gas emission spectrum may include an optical cavity 101 configured to induce the directed emission, a detection module 330 configured to collect the directed emission and a controller 290 configured to control operation of device 600.

According to some example embodiments, a detection module 330 includes a detector 350, one or more optical components 340 and a circuit 295. In some example embodiments, one or more optical components 340 includes an off axis parabolic mirror that may focus radiation in forward direction 205 toward detector 350 while scattering radiation received from alternate directions away from detector 350. Optionally, one or more optical components 340 may also include a band pass filter to reject stray light that may also be directed toward mirror 330. Detector 350 may be formed from one or more light sensitive elements and/or heat sensitive elements. For example, detector 350 may capture emitted radiation with thermal detector, photo diodes, photo cathodes and/or photo conductive detectors. Circuit 295 may control operation of detector 350, e.g. sample output from detector 350 and process the sampled output. Optionally, functionality of circuit 295 may be integrated as part of controller 290.

According to some example embodiments, optical cavity 101 includes substrates 110 and 120 separated by a distance 'd' between which the gas is contained, reflective coating 115 on facing surfaces of the substrates configured to resonate radiation emitted from the contained gas, a precision stage 160 configured to control distance 'd' between the substrates, an excitation unit 190 configured to excite the gas molecules, and a gas inlet 131 through which the gas is introduced into optical cavity 101, e.g. between substrates 110 and 120. In some example embodiments, optical cavity 101 additionally includes distance sensor 140 (see FIG. 3) configured to monitor distance between substrates 110 and 120 and together with precision stage 160, provide close loop control of distance 'd.'

Gas inlet 131 may be in the form of a through going bore 130 through which the gas may be flow inject into optical cavity 101. Alternately, the gas may be introduced into optical cavity 101 through an inlet between substrates 110 and 120.

In some example embodiments, excitation of the gas with excitation unit 190 may be thermal excitation. Alternately or additionally, excitation may be optical excitation, electrical excitation and/or chemical excitation. In some example embodiments, the excitation unit is configured to activate a Raman excitation. Thermal excitation may be actuated by heating substrates 110 and 120, may be by adding a thin film electrical heating elements inside optical cavity 101 (between substrates 110 and 120) and also may be actuated by heating the gas prior to introducing the gas in optical cavity 101 or as it is being introduced into optical cavity 101 through a tube. Thermal excitation may also be with a laser, e.g. a carbon dioxide laser, a microwave source or a radio frequency source each of which may be applied to heat the gas.

In some example embodiments, optical excitation may be induced with a blackbody source, grey body source, narrowband source or a plasmonically structured source. The optical excitation source may for example be a light emitting diode (LED) or laser. Optionally, a center wavelength of the source can be visible, short wave IR (SWIR) or M-IR. Optionally, optical excitation may be performed with multiple wavelengths, e.g. several lasers each emitting at different wavelengths. In some example embodiments, excitation may ionize the gas to enhance excitation.

In some example embodiments, precision stage 160 may be configured to maintain a parallel orientation between substrates 110 and 120 to detect a single or narrow band wavelength. In other example embodiments, a gradient spacing (e.g., controllable gradient spacing) may be introduced so that a plurality of wavelengths may be simultaneously detected in the forward direction. The gradient may be imposed with a dedicated spacing layer or based on tilting one or more of substrates 110 and 120.

Precision stage 160 may control spacing between substrates 110 and 120 mechanically, by piezo-electric actuation or with piezo-driven flexures. Optionally a mechanical modulation or dithering mechanism may be used to enable lock-in detection. Precision stage 160 may be used to align the cavity mirrors, change wavelength over a broad spectral range, and also induce cavity oscillation. Optionally, precision stage 160 may also be used to fine tune the Q factor of optical cavity 101 for optimized spectral detection, in terms of signal to noise and resolution. The Q factor may be tuned by controlling the spacing between the mirrors or by changing the alignment between the plates or by applying a surface wave on substrates 110 and 120 to effectively reduce their reflectivity. In particular, a larger space between the mirrors means light must travel farther between reflection events, hence light is trapped longer in the cavity and the Q factor increases. By tilting one plate relative to the other, one can reduce the coherence of the resonator and thereby lower the Q of the cavity. Precision stage 160 may be a single axis stage or may provide control in more than one dimension, e.g. in a tip and tilt direction. In some example embodiments, optical cavity may include one or more distance sensors 140 that may monitor distance 'd' and may provide feedback to precision stage 160. Optionally sensors 140 are capacitive based sensors.

In some example embodiments, precision stage 160 is configured to scan separation 'd' between substrates 110 and 120 in order to generate an emission spectrum as a function of wavelength. At each separation 'd', the substrates may be made to oscillate for the purpose of making the signal extraction more robust with respect to noise and background black-body radiation. Oscillation may be at a constant frequency or based on dithering. Amplitude of oscillation may be a fraction of a step amplitude applied for scanning. Ranges for amplitudes may be 1 nm to 100 nm or larger, depending on the wavelengths that are being detected.

Figure 3:
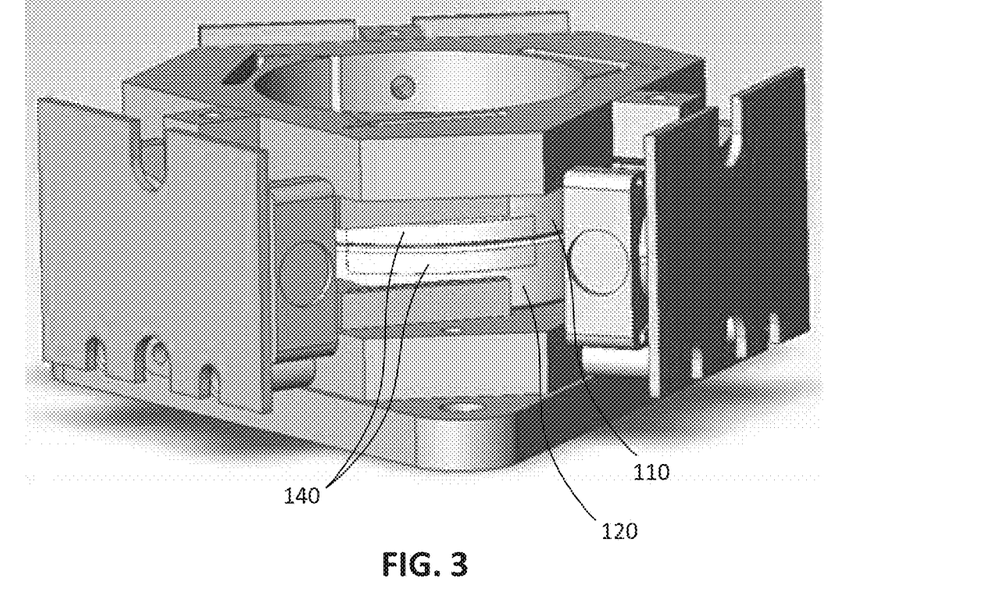
FIG. 3 is an example optical cavity with adjustable spacing between its reflective surfaces in accordance with some example embodiments.

Reference is now made to FIG. 3 showing an example optical cavity with adjustable spacing between its reflective surfaces in accordance with some example embodiments. FIG. 3 show substrates 110 and 120, and thin film conductive coatings 140 to measure capacitance for the distance sensors.

Figure 4:
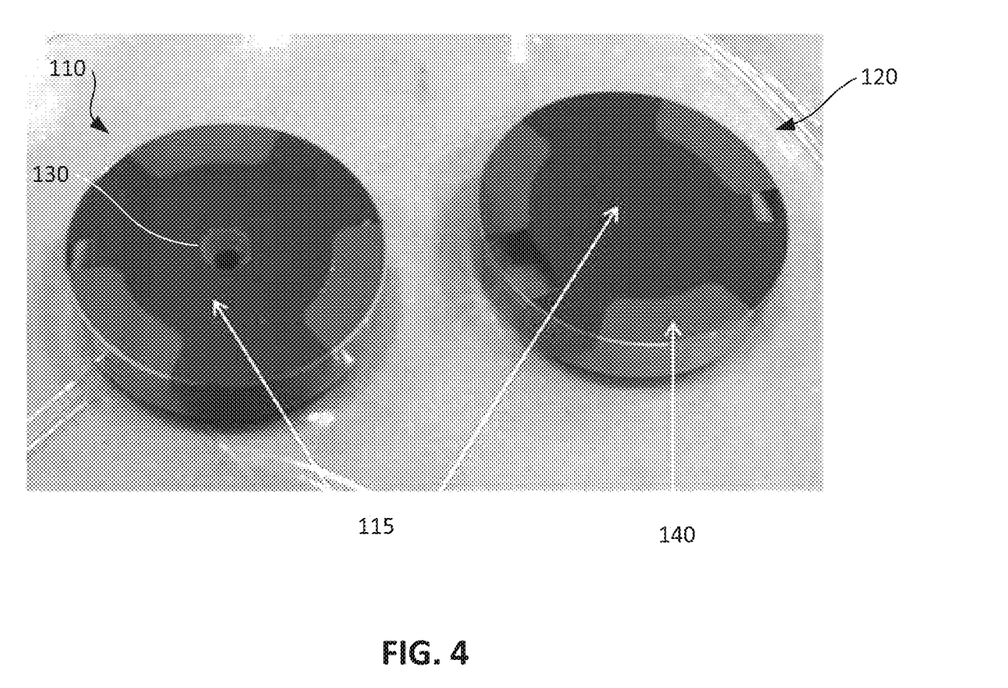
FIG. 4 is an example pair of substrates with reflective surfaces for an optical cavity in accordance with some example embodiments.

Reference is now made to FIG. 4 showing an example pair of substrates with reflective surfaces for an optical cavity in accordance with some example embodiments. Each of substrates 110 and 120 may be disk shaped and may be formed from calcium fluoride, zinc selenide, sapphire, glass, plastic, quartz, magnesium fluoride, germanium, silicon, or other substrates that are compatible with and optically transparent in the spectral region of interest. According to some example embodiments, a portion of each of substrates 110 and 120 may be coated with coating 115 that is reflective over a selected spectral range. Optionally, each of substrates 110 and 120 may also include one or more metallic pads 140 configured to align with each other when substrate 110 and 120 are assembled. Optionally, each of substrates 110 and 120 include a set of three metallic pads 140. Metallic pads 140 may for example be adhered to the substrates or may be coated on the substrates. An electric circuit associated with controller 290 (FIG. 2) may be connected to metallic pads 140 and may sense separation between metallic pads 140 based on capacitive coupling between matching metallic pads 140. Metallic pads 140 together with accompanying the electric circuit may form capacitive sensor 140 (FIG. 2).

Figure 5:
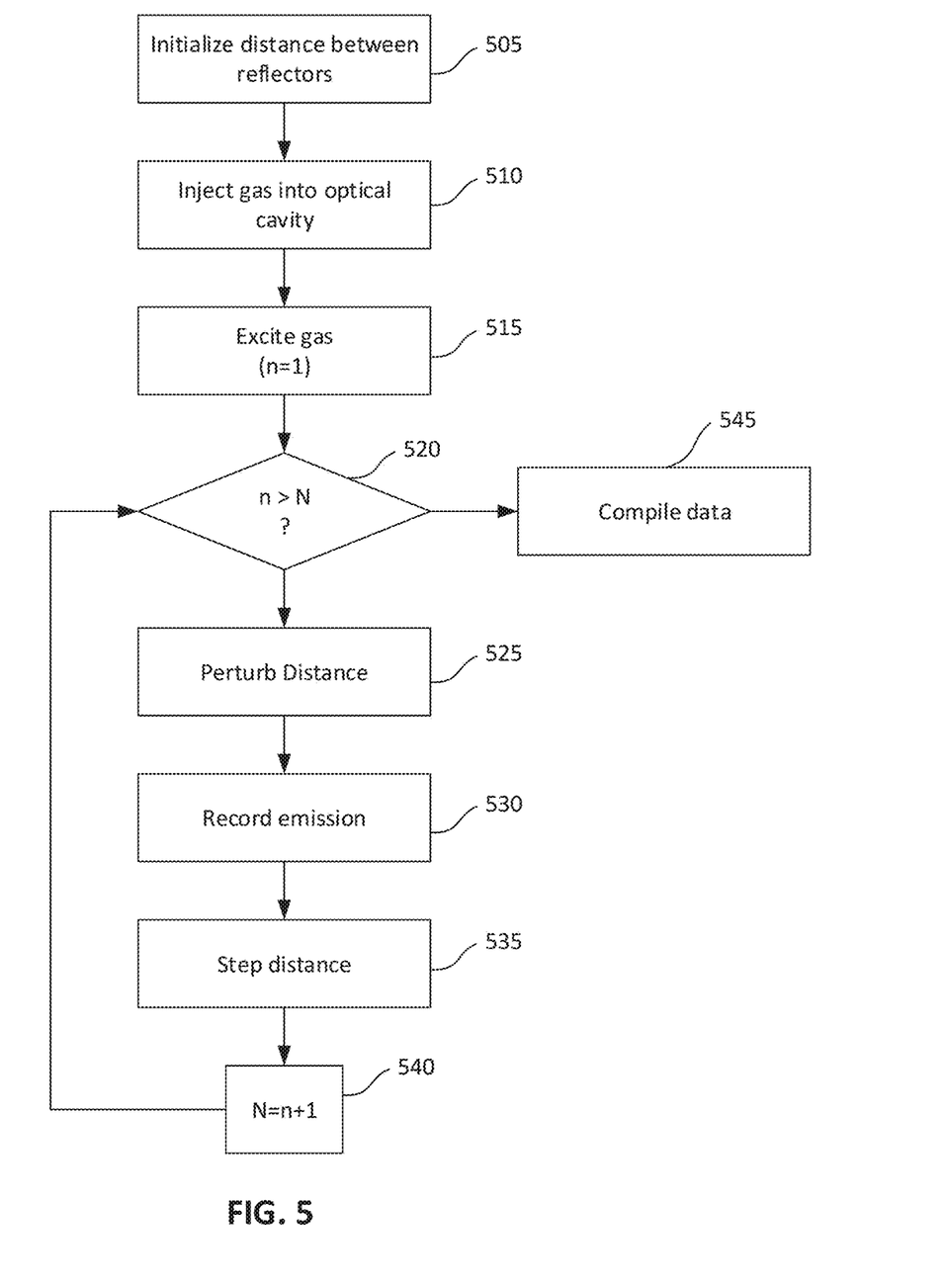
FIG. 5 is a simplified flow chart of an example method to detect emission spectrum of a gaseous material in accordance with some example embodiments.

FIG. 5 is a simplified flow chart of an example method to detect emission spectrum of a gaseous material in accordance with some example embodiments. According to some example embodiments, a distance between reflective surfaces of an optical cavity is initialized (block 505). Optionally the distance is defined based on the gas that is to be detected with the optical cavity. The gas may be injected into the optical cavity (block 510) in a bore formed through one of the substrates or between the substrates. Optionally, other materials introduced into a carrier gas or that have been vaporized may be analyzed. According to some example embodiments, prior to detecting the emission, the gas in the optical cavity is put into an excited state (block 515). The gas may be excited as it is introduced into the optical cavity or while the gas is in the optical cavity.

According to some example embodiments, detection may be performed over a single cycle or over plurality of cycles (N cycles) in which the distance between reflective surfaces is stepped (block 535) to generate a spectrum of spectrally resolved detection (block 520 and block 540). In some example embodiments, for each distance detected, the optical cavity is perturbed (block 525) while recording the emission (block 530).

Figure 6:
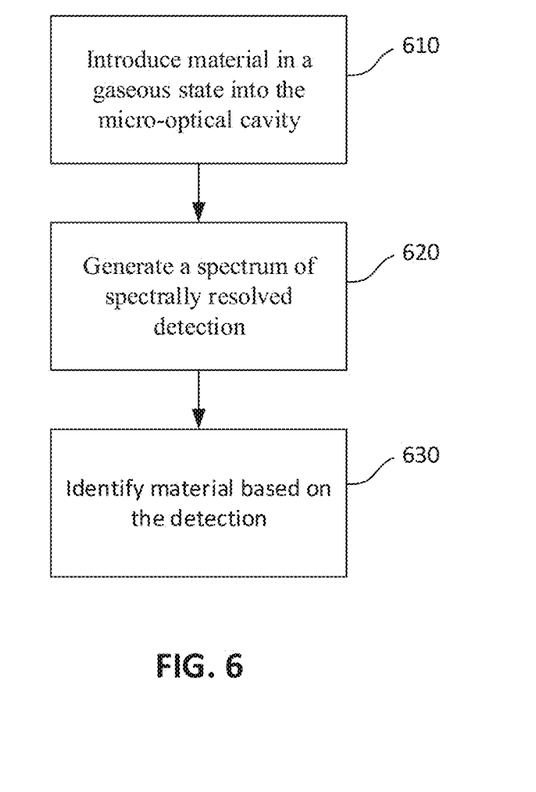
FIG. 6 is a simplified flow chart of an example method to identify a material based on its emission spectrum in accordance with some example embodiments.

FIG. 6 is a simplified flow chart of an example method to identify a material based on its emission spectrum in accordance with some example embodiments. According to some example embodiments, a material to be identified is introduced into an optical micro-cavity as described herein (block 610). In some example embodiments, parameters of the optical micro-cavity may be configured specifically for the type of material introduced into the cavity. For example, reflective coating on substrates of the optical micro-cavity may be defined to be reflective over a selected spectral range. Furthermore, a distance 'd' or a range of distances between the substrates of the optical micro-cavity may also be selectively defined based on the type of material introduced into the cavity. In some example embodiments, a spectrum of spectrally resolved detection is generated and detected as described herein (block 620). Based on the spectrally resolved detection, the material or defined parameters of the material in the optical micro-cavity may be identified (block 630).

Figure 7:
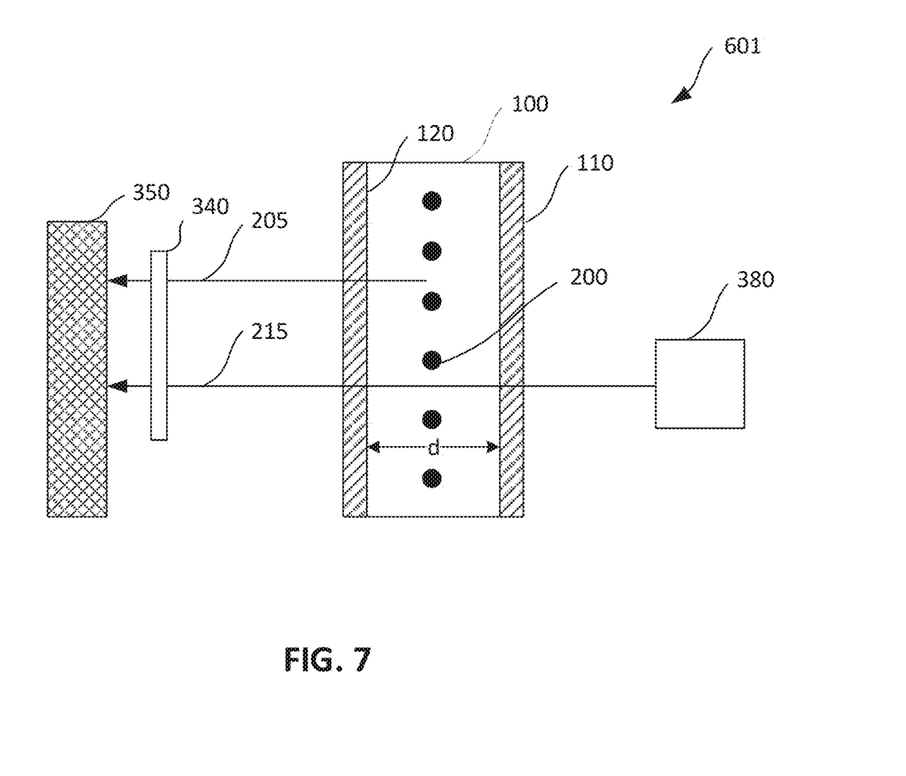
FIG. 7 is a simplified block diagram of a device configured to spectrally resolve optical radiation based on both emission and absorption properties.

FIG. 7 is a simplified block diagram of a device configured to spectrally resolve optical radiation based on both emission and absorption properties. According to some example embodiments, a device 601 is configured to spectrally resolve optical radiation based on both emission and absorption properties. In some example embodiments, a radiation source 380 may emit radiation 215 through optical cavity 100 including material 200 that may be partially absorbed by material 200. In addition, material 200 may emit radiation 205 based on induced excitation. Radiation 205 may be excited based on radiation source 380 or a dedicated excitation source. According to some example embodiments, both radiation 205 and radiation 215 may be detected with detector 350 using the same optical components 340. Optionally, a separate detector 350 may be used for detecting emission based on radiation 205 and for absorption based on radiation 215. In some example embodiments, substrates 120 may include a dual wavelength range optical coating that is highly reflective in both the wavelength of radiation 205 and radiation 215, thus supporting cavity resonance at both wavelengths.

According to some example embodiments, device 601 is configured to detect and resolve wavelengths of light 205 that are emitted by material 200 in optical cavity 100 and wavelengths of light 215 that are absorbed by material 200. Optionally, device 601 may also function as a spectrometer for light 215 absorbed by material 200 based on the scanning of the cavity over different substrate separations. According to some example embodiments, both the emission spectrum and absorption spectrum of material 200 is detected by scanning the separation, 'd' between substrates 110 and 120, e.g. over a single scan. Detecting both emission and absorption spectra may improve accuracy in identifying material 200. Optionally, the absorption spectrum may provide more information at specific ranges of the separation, 'd' as compared to the emission spectrum. A combination of different wavelengths, e.g. IR, visual and/or UV may be radiated with light source 380 to determine the absorption spectra.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

In addition, any priority document(s) of this application is/are hereby incorporated herein by reference in its/their entirety.

What is claimed is:

1. A device configured to detect spectrally resolved emission from a material, the device comprising:
   an optical cavity comprising a pair of substrates separated by a distance defined to restrict a photonic density of states (DOS) of the material to be detected, wherein the pair of substrates includes facing reflective surfaces;
   a detector oriented with respect to the optical cavity to receive emission from the optical cavity, wherein the detector includes at least one optical component configured to direct emission in a defined direction toward the detector and scatter emissions in alternate directions away from the detector; and
   a controller configured to control the distance.

2. The device of claim 1, wherein the facing reflective surfaces are plane parallel surfaces.

3. The device of claim 1, wherein the DOS is selected such that at least 25% of photons characterized by a predetermined wavelength are emitted by the cavity in a defined direction or such that at least 50% of photons characterized by a predetermined wavelength are emitted by the cavity in a defined direction.

4. The device of claim 3, wherein the detector is oriented to detect emission in a direction that is perpendicular to the pair of substrates.

5. The device of claim 1, wherein the distance is defined to be in a same size scale as an integer multiple of half wavelengths of the wavelength being emitted in the defined direction.

6. The device of claim 1, wherein the distance is between 1 μm to 25 μm and is configured to detect mid-infrared (MIR) emission, on the scale of 100 nm configured to detect ultraviolet emission or between 0.7-1 mm configured to detect long wavelength infrared.

7. The device of claim 1, comprising a precision stage configured to adjust separation of the pair of substrates to the defined distance, wherein the precision stage is configured to step the defined distance over a series of pre-defined steps, wherein each of the pre-defined steps is configured to impose a different angular dependency of the wavelengths emitted by the material being detected.

8. The device of claim 7, wherein the precision stage is configured to perturb the defined distance during detection by the detector.

9. The device of claim 7, wherein the precision stage is a tripod piezo stage including Tip, Tilt, and Z movement and is based on piezo-electric actuation or piezo driven flexures, wherein the precision stage is configured to provide nanometer accuracy and parallelism, to impose a gradient in the distance defined between the pair of to impose perturbations on the pair of substrates.

10. The device of claim 7, wherein the optical cavity is associated with a capacitive based distance sensor configured to sense distance between the pair of substrates.

11. The device of claim 1, wherein the facing reflective surfaces are formed with one or more of a metal coating, dielectric coating, and semiconductor coating on the substrate.

12. The device of claim 1, comprising a through going bore, through one of the pair of substrates configured to define an inlet for the material to be detected.

13. The device of claim 1, comprising an excitation device configured to activate excitation of the material to be detected based on thermal excitation, wherein the thermal excitation includes at least one of heating at least one of the pair of substrates, heating the optical cavity with transparent conducting electrodes, and heating the material to be detected with a heating element associated with a tube through which the material to be detected enters the optical cavity.

14. The device of claim 13, wherein the excitation unit is configured to activate the excitation based on one or more of optical excitation and electrical excitation and wherein the excitation unit is configured to work in conjunction with absorption measurements.

15. The device of claim 14, wherein the excitation unit is configured to activate the excitation based on laser excitation using one or more lasers or based on Raman excitation.

16. The device of claim 1, comprising a radiation source configured to radiate through the optical cavity and activate excitation of the material to be detected, wherein the detector is configured to detect absorption of the radiation by the material in the optical cavity.

17. The device of claim 1, comprising at least one of a spatial filter and a band pass filter through which the emission is received, wherein the at least one of the spatial filter and the band pass filter is configured to reject stray radiation that is directed toward the detector.

18. The device of claim 1, wherein the device is configured to detect spectrally resolved emission from a material in its gaseous state.

19. A method to detect spectrally resolved emission from a material, the method comprising:
introducing the material in a gaseous state into an optical cavity with facing reflective surfaces separated by a distance that is defined to restrict a photonic density of states of the material;
exciting the material in the gaseous state; and
selectively detecting emission from the optical cavity emitted in a defined direction based on directing emission in a defined direction toward a detector and scatter emissions in alternate directions away from the detector, wherein the emission in the defined direction is configured to be spectrally resolved based on the defined distance between the facing reflective surfaces.

20. The method of claim 19, comprising applying a selected surface wave on the facing reflective surfaces, wherein the surface wave is selected to reduce reflectivity of the facing reflective surfaces, and wherein the facing reflective surfaces are plane-parallel surfaces.

21. The method of claim 19, wherein the defined direction is perpendicular to the facing reflective surfaces.

22. The method of claim 19, wherein the distance is defined to be in a same size scale as an integer multiple of half wavelengths of the wavelength being emitted in the defined direction and wherein the distance is between 1 µm to 25 µm configured to detect mid-infrared (MIR) emission, on the scale of 100 nm configured to detect ultraviolet emission or between 0.7-1 mm configured to detect long wavelength infrared.

23. The method of claim 19, comprising identifying the material based on the emission detected.

24. The method of claim 23, comprising identifying the material based on the emission detected combined with wavelengths absorbed, wherein the emission by the material and the absorption by the material is detected simultaneously.

25. The method of claim 19, comprising perturbing the defined distance between the facing reflective surfaces during the detection, wherein an amplitude of the perturbing is 0.1% to 5% of the defined distance between the facing reflective surfaces.

26. The method of claim 19, comprising stepping the defined distance over a series of pre-defined steps and detecting emission from the optical cavity in each of the defined pre-defined steps, wherein the stepping is configured to alter an angular dependency of wavelengths emitted by the material being detected.

27. The method of claim 26, comprising detecting absorption from the optical cavity in each of the defined pre-defined steps and identifying the material based on one or more of an emission spectrum detected over the pre-defined steps and an absorption spectrum detected over the pre-defined steps.

28. The method of claim 19, wherein the material is flow injected into a through going bore through one of the facing reflective surfaces.

29. The method of claim 19, wherein the exciting is based on one or more of thermal, optical and electrical based excitation.

* * * * *